United States Patent [19]

Hayashi et al.

[11] Patent Number: 4,860,540
[45] Date of Patent: Aug. 29, 1989

[54] STATIC HYDRAULIC PRESSURE TYPE CONTINUOUSLY VARIABLE TRANSMISSION

[75] Inventors: Tsutomu Hayashi, Tokyo; Eiichi Hashimoto, Saitama, both of Japan

[73] Assignee: Honda Giken Kogyo Kabushiki Kaisha, Tokyo, Japan

[21] Appl. No.: 243,169

[22] Filed: Sep. 8, 1988

Related U.S. Application Data

[63] Continuation of Ser. No. 148,102, Jan. 26, 1988, abandoned, which is a continuation of Ser. No. 811,706, Dec. 20, 1985, abandoned.

[30] Foreign Application Priority Data

Dec. 26, 1984 [JP] Japan ................................ 59-277816

[51] Int. Cl.$^4$ ............................................ F16D 39/00
[52] U.S. Cl. ...................................... 60/487; 91/506
[58] Field of Search ................ 60/487, 488, 489, 490, 60/443; 91/506; 92/12.2

[56] References Cited

U.S. PATENT DOCUMENTS

| 24,317 | 5/1857 | Schott .................................. 60/53 |
|---|---|---|
| 1,263,180 | 4/1918 | Williams . |
| 1,274,391 | 8/1918 | Davis . |

(List continued on next page.)

FOREIGN PATENT DOCUMENTS

| 23390 | 8/1936 | Australia . |
|---|---|---|
| 143400 | 5/1950 | Australia . |
| 231526 | 4/1959 | Australia . |
| 268529 | 11/1963 | Australia . |
| 143921 | 7/1935 | Austria . |
| 191742 | 9/1957 | Austria . |
| 240661 | 10/1964 | Austria . |
| 317649 | of 1919 | Fed. Rep. of Germany . |
| 880989 | 7/1949 | Fed. Rep. of Germany . |
| 1200135 | 9/1965 | Fed. Rep. of Germany . |
| 1480553 | 6/1969 | Fed. Rep. of Germany . |
| 1500480 | 7/1969 | Fed. Rep. of Germany . |
| 1625039 | 5/1970 | Fed. Rep. of Germany . |
| 1951381 | 8/1977 | Fed. Rep. of Germany . |
| 2456473 | 8/1977 | Fed. Rep. of Germany . |
| 3139191 | 4/1983 | Fed. Rep. of Germany . |
| 791714 | of 1935 | France . |
| 32-7159 | 2/1957 | Japan . |
| 41-3208 | 4/1966 | Japan . |
| 46-11852 | 3/1971 | Japan . |
| 56-143856 | 11/1981 | Japan . |
| 70968 | 4/1982 | Japan . |
| 57-70968 | 5/1982 | Japan . |
| 38467 | 2/1984 | Japan . |

(List continued on next page.)

Primary Examiner—Edward K. Look
Attorney, Agent, or Firm—Lyon & Lyon

[57] ABSTRACT

A static hydraulic pressure type continuously variable transmission formed with a hydraulic closed circuit between a swashplate type hydraulic pump and a swashplate type hydraulic motor, the hydraulic motor being constructed such that its motor cylinder is integrally connected to an output shaft which extends through a motor swashplate and a swashplate holder for supporting the back surface of the motor swashplate, a swashplate anchor for supporting the back surface of the swashplate holder being axially immovably connected to the output shaft through a thrust bearing, and that the swashplate anchor is unrotatably connected to a casing which rotatably supports the output shaft. The motor cylinder and a pump cylinder of the hydraulic pump are provided coaxially with the hydraulic closed circuit interposed therebetween. The hydraulic closed circuit is provided with a distribution valve for bringing low and high pressure oil passages, which are in communication with cylinder bores of the pump cylinder, into selective communication with cylinder bores of the motor cylinder, and a clutch valve for controlling communication between the low and high pressure oil passages. Where the swashplate type hydraulic motor is of a variable capacity type, means is provided which adjusts an angle of inclination of the motor swashplate to effect speed change control.

114 Claims, 4 Drawing Sheets

U.S. PATENT DOCUMENTS

| | | |
|---|---|---|
| 1,533,399 | 4/1925 | Dunlap . |
| 2,388,462 | 11/1945 | Beeh ................................ 103/173 |
| 2,395,980 | 3/1946 | Wahlmark ............................ 60/53 |
| 2,617,360 | 11/1952 | Barker . |
| 2,651,386 | 9/1953 | Rossell ................................ 188/98 |
| 2,662,375 | 12/1953 | Postel et al. ................ 60/490 X |
| 2,683,421 | 7/1954 | Woydt ................................ 91/481 |
| 2,844,002 | 7/1958 | Pavesi ................................ 60/53 |
| 2,907,230 | 10/1959 | Kollmann ............................ 74/687 |
| 2,957,421 | 10/1960 | Mock . |
| 2,984,070 | 5/1961 | Bauer ................................ 60/53 |
| 3,036,434 | 5/1962 | Mark ................................ 60/53 |
| 3,054,263 | 9/1962 | Budzich ............................ 60/53 |
| 3,065,700 | 11/1962 | Blenkle . |
| 3,131,539 | 5/1964 | Creighton et al. ................ 60/53 |
| 3,133,418 | 5/1964 | Froebe ................................ 60/53 |
| 3,143,858 | 8/1964 | Roeske ................................ 60/53 |
| 3,161,023 | 12/1964 | Margolin . |
| 3,165,892 | 1/1965 | Roberts ................................ 60/53 |
| 3,170,297 | 2/1965 | Larson ................................ 60/53 |
| 3,175,363 | 3/1965 | Molly ................ 60/488 X |
| 3,187,868 | 6/1965 | Gantzer ................................ 192/101 |
| 3,190,232 | 6/1965 | Budzich . |
| 3,204,411 | 9/1965 | Stockton . |
| 3,213,619 | 10/1965 | Creighton ............................ 60/53 |
| 3,274,947 | 9/1966 | Jonkers ................................ 103/163 |
| 3,313,108 | 4/1967 | Allgaier et al. ................ 60/53 |
| 3,314,234 | 4/1967 | Orshansky . |
| 3,372,545 | 3/1968 | Hyde . |
| 3,373,635 | 3/1968 | Meurer . |
| 3,382,813 | 5/1968 | Schauer ............................ 91/506 X |
| 3,416,312 | 12/1968 | Margolin ............................ 60/53 |
| 3,455,184 | 7/1969 | Frandsen et al. . |
| 3,543,514 | 12/1970 | Reimer ................................ 60/53 |
| 3,620,130 | 11/1971 | Roberts ................................ 91/506 |
| 3,698,189 | 10/1972 | Reimer ................................ 60/53 A |
| 3,834,164 | 9/1974 | Ritter ................................ 60/492 |
| 4,080,992 | 3/1978 | Niederer ............................ 137/636 |
| 4,086,822 | 5/1978 | Kuroda ............................ 74/473 R |
| 4,170,279 | 10/1979 | Pelletier ............................ 188/300 |
| 4,444,093 | 4/1984 | Koga . |
| 4,646,520 | 3/1987 | Furumoto . |

FOREIGN PATENT DOCUMENTS

| | | |
|---|---|---|
| 59-38467 | 9/1984 | Japan . |
| 473997 | 6/1969 | Switzerland . |
| 535555 | 4/1941 | United Kingdom . |
| 574991 | 1/1946 | United Kingdom . |
| 835936 | 5/1960 | United Kingdom . |
| 890591 | 3/1962 | United Kingdom . |
| 902978 | 8/1962 | United Kingdom . |
| 1021873 | 3/1966 | United Kingdom . |
| 1222200 | 2/1971 | United Kingdom . |
| 1282094 | of 1972 | United Kingdom . |
| 1521494 | 8/1978 | United Kingdom . |
| 2104976 | 3/1983 | United Kingdom . |

STATIC HYDRAULIC PRESSURE TYPE CONTINUOUSLY VARIABLE TRANSMISSION

This application is a continuation of application Ser. No. 148,102, filed 1/26/88, now abandoned.

BACKGROUND OF THE INVENTION

The field of the present invention relates to static hydraulic pressure type continuously variable transmissions, and more particularly to such transmissions in which a hydraulic closed circuit is formed between a swashplate type hydraulic pump and a swashplate type hydraulic motor.

A static hydraulic pressure type continuously variable transmission of the type herein referred to is disclosed, for example, in Japanese Patent Application Laid-Open No. 70,968/82 Specification and Japanese Patent Publication No. 38,467/84 Specification.

In conventional static hydraulic pressure type continuously variable transmissions a motor cylinder and a motor swashplate of a hydraulic motor are independently supported on a casing. This can result in a great thrust load, applied to the motor swashplate from a group of motor plungers in sliding contact with the motor cylinder, being borne by the casing during operation. Accordingly, such as casing is preferably to be formed with highly rigid wall thickness, which can be heavy.

In addition, a pump cylinder of such as hydraulic pump and a motor cylinder of such a hydraulic motor are concentrically arranged with the former disposed internally of the latter. In such an arrangement the external large-diameter motor cylinder is heavy.

Furthermore, in a conventional static hydraulic pressure type continuously variable transmission, a pump cylinder of the hydraulic pump is pressed in sliding contact against a distribution board fixedly mounted on the motor cylinder of the hydraulic motor so that working fluids of the hydraulic pump and hydraulic motor are transferred through an oil path extending through the rotary sliding surfaces. Because of this, pressurized oil tends to leak from between the opposed rotary sliding surfaces of the distribution board and the pump cylinder, leading to deterioration of transmission efficiency due to such leakage.

In addition, in a conventional apparatus provided with a variable capacity swashplate type hydraulic motor, a hydraulic servo is connected to a motor swashplate to lightly adjust an angle of inclination of the motor swashplate, as is well known. However, the hydraulic servo-motor has a complicated construction and is expensive.

Moreover, in a conventional construction, a clutch valve and its operating system, which control communication and between the discharge and intake sides of the hydraulic pump for regulating power transmission from the hydraulic pump to the hydraulic motor, project axially from the end of the hydraulic motor increasing the overall length of the transmission. This is particularly true where the hydraulic pump and the hydraulic motor are disposed on one and the same axis.

SUMMARY OF THE INVENTION

It is the primary object of the present invention to inexpensively provide a static hydraulic pressure type continuously variable transmission which is free the disadvantages noted above and which is light-weight and small, and has excellent transmission efficiency.

For achieving the aforementioned object, according to the present invention, an output shaft extending through a motor swashplate and a swashplate holder which supports a back surface of the motor swashplate is integrally connected to a motor cylinder. A swashplate anchor for supporting a back surface of the swashplate holder is connected axially immovably to the output shaft through a thrust bearing, so as to be axially immovable relative to the output shaft. The swashplate anchor is connected nonrotatably to a casing for rotatably supporting the output shaft.

According to the present invention, there is further provided an arrangement wherein the motor cylinder and the pump cylinder of the hydraulic pump are integrally connected with each other on the same axis. A hydraulic closed circuit is formed between both the cylinders. A support shaft for rotatably supporting the pump cylinder and having an input member mounted thereon in such a manner as to be relatively rotatable but axially immovable is rotatably supported on the casing.

According to the present invention, there is still further provided an arrangement wherein a pump cylinder and a motor cylinder are integrally connected to an output shaft. A number of annularly disposed cylinder bores of the pump cylinder and a number of annularly disposed cylinder bores of the motor cylinder are concentrically arranged. An annular high pressure oil passage communicating with the cylinder bores of the pump cylinder through a discharge valve and an annular low pressure oil passage communicating with the cylinder bores of the pump cylinder through an intake valve are formed between the pump and motor cyclinders. A distribution valve is disposed which can reciprocate between a radial outward position and an inward position to alternately bring the cylinder bores of the motor cylinder into communication with the high pressure oil passage and low pressure oil passage, the distribution valve is associated with an eccentric actuating device which is adapted to impart reciprocating motion to the distribution valve in response to rotating movements of the pump cylinder and motor cylinder. The cylinder bores of the motor cylinder are brought into communication with the high pressure oil passage during the expansion stroke thereof are into communication with the low pressure oil passage during contraction stroke thereof.

According to another aspect of the present invention, there is proposed an arrangement wherein an odd number of motor plungers are used for the hydraulic motor. A swashplate holder for supporting a motor swashplate of the hydraulic motor is tiltably supported on a fixed casing through a trunnion shaft fixed to the holder. A operating lever secured to the trunnion shaft is connected at one end to a piston fitted into a stationary cylinder, the piston being slidably movable in a rotating direction of the trunnion shaft. A first and a second oil chamber defined between the cylinder and the piston in a manner opposing each other with the piston interposed therebetween are brought into communication with each other through a hydraulic conduit filled with working oil. The hydraulic conduit incorporates therein a speed change control valve capable of being selectively switched between a hold position for placing the hydraulic conduit in a cut-off state, a speed reducing position for placing the hydraulic conduit in a conductive state only in one direction from the first oil chamber to the second oil chamber, and a speed increasing position for placing the hydraulic conduit in conductive state only in one direction from the second oil chamber to the first oil chamber.

According to a further aspect of the present invention, there is provided an arrangement wherein an annular low pressure oil passage and an annular high pressure oil passage are concentrically located adjacent a group of annularly disposed cylinder bores of a pump cylinder of the hydraulic pump so as to communicate with those cylinder bores through an intake valve and a discharge valve. A clutch valve capable of opening and closing a valve hole extending in a radial direction for communication between the low and high pressure oil passages is mounted to the valve hole. There are further provided in addition to the just-mentioned construction, a plurality of valve holes and clutch valves, and a common clutch control ring for opening and closing these clutch valves which is supported on the outer circumferential surface of the pump cylinder.

With the arrangements described above, all the thrust load imposed on the motor swashplate from the group of motor plungers of the motor cylinder can be borne by the motor cylinder system itself, and accordingly, the casing may need not bear the thrust load so that it may be light-weight and compact.

Furthermore, the pump cylinder and the motor cylinder are coaxially arranged so that they may be formed of the same diameter and accordingly, either of the cylinders may be formed to have as small a diameter as possible without being restricted by the other cylinder. Thus, a static hydraulic pressure type continuously variable transmission further reduced in size and weight can be devised.

In addition, with the arrangement that the pump cylinder and the motor cylinder are integrally connected to the output shaft, a large number of distribution valves may be disposed in radial direction. The distribution valves alternately bring the annular low pressure oil passage and high pressure oil passage, which respectively communicate with a large number of cylinder bores annularly disposed in the pump cylinder through the intake valve and the discharge valve, into communication with a large number of cylinder bores annularly disposed in the motor cylinder. A eccentric actuating device maybe associated with the distribution valves to impart reciprocating motion to the distribution valves in accordance with rotation of the pump cylinder and motor cylinder with this arrangement it is ensured that working fluid is transferred between the hydraulic pump and the hydraulic motor without necessitating relative rotation of the pump cylinder and motor cylinder. Little leaking of working fluid occurs in the reciprocating distribution valves, and thus the aforesaid transfer of working fluid is achieved positively to greatly increase the transmission efficiency.

Moreover, if an odd number of motor plungers are used and the swashplate holder for carrying the motor swashplate is controlled in its tilting movement through the trunnion shaft by a speed change control valve, the angle of tilting of the motor swashplate may be freely adjusted by merely switching the speed change control valve while making use of vibratory tilting torque imposed on the motor swashplate from the group of the odd number of motor plungers. This enables a desired speed change ratio to be obtained. In addition, the construction required to provide such a function is very simple an less effusive as compared with those which use a hydraulic servo-motor.

Between the low pressure oil passage and high pressure oil passage, which are arranged adjacent the group of cylinder bores of the pump cylinder, a clutch valve is provided in the radial direction of the pump cylinder. Thus, the communication and interruption between the discharge side and the intake side of the hydraulic pump may be controlled by the clutch valve. Furthermore since the whole length of the transmission is not extended by the provision of the clutch valve, the transmission can be relatively compact. In addition to the aforesaid construction, the clutch valves and valve holes for slidably receiving the valves are used in plural number, and the common clutch control ring for opening and closing these clutch valves is carried on the outer circumferential surface of the pump cylinder. This allows the plurality of clutch valves to be opened and closed by a single clutch control ring mailing construction simple. The short-circuit resistance between the discharge side and intake side of the hydraulic pump at the time of opening of the valves may also be minimized to obtain a positive cut-off power transmission. In addition, the whole length of the transmission is not extended even by the presence of the clutch control ring, contributing to reduction in size of the transmission.

The above and other objects, features and advantages of the present invention will be apparent from the ensuing detailed description of a preferred embodiment in connection with the accompanying drawings.

BRIEF DESCRIPTION OF THE DRAWINGS

The drawings show one embodiment of the present invention.

DESCRIPTION OF THE PREFERRED EMBODIMENT

Figure 1:
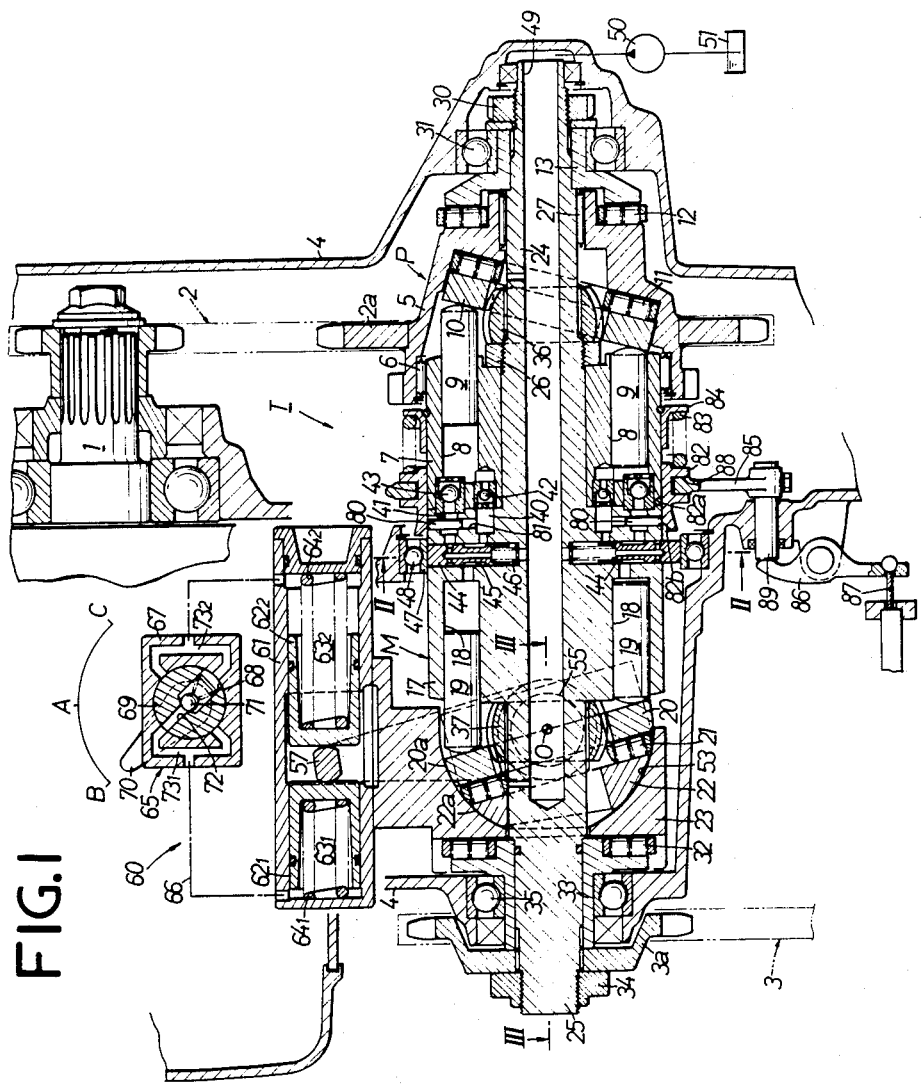
FIG. 1 is a longitudinal plan view of a static hydraulic pressure type continuously variable transmission incorporated in a power transmission system of a motorcycle.

Referring now to the drawings and more particularly to FIG. 1, power of a motor-cycle engine is transmitted from a crank shaft 1 to an unshown rear wheel via a chain type primary reduction gear 2, a static hydraulic pressure type continuously variable transmission T and a chain type secondary reduction gear 3.

The continuously variable transmission T comprises a swashplate type hydraulic pump P of a constant capacity type and a swashplate type hydraulic motor M of a variable capacity type, which are accommodated within a crank case 4 as a casing which carries a crank shaft 1.

The hydraulic pump P comprises a cup-like input member 5 integrally provided with an output sprocket 2a of the primary reduction gear 2. A pump cylinder 7 is relatively rotatably fitted in the inner peripheral wall of the input member 5 through a needle bearing 6. Pump plungers 9, 9 . . . are slidably fitted in a plurality and odd-number of annularly disposed cylinder bores 8, 8 provided in the pump cylinder 7 so as to surround the rotary center thereof, and a pump swashplate 10 is in contact with the outer ends of the pump plungers 9, 9 . . .

The back surface of the pump swashplate 10 is rotatably supported on the inner end wall of the input member 5 in an attitude inclined by a predetermined angle with respect to the axis of the pump cylinder 7 through a thrust roller bearing 11. When the input member 5 is rotated, the pump plungers 9, 9 . . . are reciprocated to repeatedly effect suction and exhaust strokes.

The back surface of the input member 5 is supported on a support sleeve 13 through a thrust roller bearing 12.

On the other hand, the hydraulic motor M comprises a motor cylinder 17 coaxially and closely coupled to the pump cylinder 7. A support shaft 24 and an output shaft 25 are integrally formed to central parts of both inner and outer ends of the motor cylinder 17 and extending in an axial direction. Motor plungers 19, 19 . . . are respectively slidably fitted in a plurality and odd-number of annularly disposed cylinder bores 18, 18 . . . provided in the motor cylinder 17 so as to surround the rotary center thereof. A motor swashplate 20 is in contact with outer ends of the motor plungers 19, 19 . . . . A swashplate holder 22 for supporting the back surface of the motor swashplate 20 through a thrust roller bearing 21 is positioned in a swashplate anchor 23 for supporting the back surface of the swashplate holder 22.

The motor swashplate 20 is tiltingly movable between an upright position at right angles to the axis of the motor cylinder 17 and a position inclined at a certain angle. At an the inclined position, the motor plungers 19,19 . . . are reciprocated upon rotation of the motor cylinder 17 to repeatedly effect expansion and contraction strokes.

The aforesaid support shaft 24 extends through the central portion of the pump cylinder 7. A nut 26 is threadedly engaged with the support shaft 24 to retain the pump cylinder 7 and the motor cylinder 17 integrally connected to each other. The support shaft 24 further extends through the input member 5 and rotatably supports the input member 5 through a needle bearing 27.

On the outer periphery of the support shaft 24, the support sleeve 13 is splined-fitted and secured by means of a nut 30. The support shaft 24 is rotatably supported in the crank case 4 through the support tube 13 and a roller bearing 31.

The aforesaid output shaft 25 extends through the central portion of the motor swashplate 20, the swashplate holder 22 and the swashplate anchor 23. A support sleeve 33 for supporting the back surface of the swashplate anchor 23 through a thrust roller bearing 32 is splined-fitted to the end of the shaft 25 and is secured by means of a nut 34 with an input sprocket 3a of the secondary reduction gear 3. The output shaft 25 is rotatably supported on the crank case 4 through the support sleeve 33 and a roller bearing 35.

Secured to the support shaft 24 is a spherical spline member 36 in spline engagement with the inner peripheral surface of the pump swashplate 10 in a manner relatively tiltable in all directions, and secured to the output shaft 25 is a spherical spline member 37 in spline engagement with the inner peripheral surface of the motor swashplate 20 relatively tiltably in all directions. The couplings of the spiral spline members 36 and 37 with the swashplates 10 and 20 suppresses to the minimal extent frictional contact between a group of pump plungers 9, 9 . . . and the pump swashplate 10 and between the motor plungers 19, 19 . . . and the motor swashplate 20.

Between the hydraulic pump P and the hydraulic motor M is formed a hydraulic closed circuit as described hereinafter.

In the motor cylinder 17, an annular high pressure oil passage 40 and an annular low pressure oil passage 41 to encircle the oil passage 40 are provided between the group of cylinder bores 8, 8 . . . of the pump cylinder 7 and the group of cylinder bores 18, 18 . . . of the motor cylinder 17. The high pressure oil passage 40 communicates with the cylinder bores 8, 8 . . . of the pump cylinder 7 through discharge valves 42, 42 . . . . The low pressure oil passage 41 communicates with the cylinder bores 8, 8 . . . through intake valves 43, 43 . . . . Accordingly, the discharge valves 42 and the intake valves 43 are respectively provided in the same number as that of the pump plungers 9, 9 . . . .

These high and low pressure oil passages 40, 41 are both communicated with the cylinder bores 18, 18 . . . of the motor cylinder 17 through respective distribution valves 44, 44 . . . . Accordingly, the distribution valves 44 are provided in the same number as that of the motor plungers 19, 19 . . . .

The distribution valves 44, 44 . . . , which are of a spool type, are slidably fitted into valve holes 45, 45 . . . radially provided in the motor cylinder 17 between the group of cylinder bores 18, 18 . . . and the high and low pressure oil passages 40, 41. When the valve 44 occupies the radial inward position in the valve hole 45, there is provided a communication between the corresponding cylinder bore 18 and high pressure oil passage 40 whilst the cylinder bore 18 is shut off from the low pressure oil passage 41, and when the valve 44 occupies the radial outward position in the valve hole 45, there is provided a communication between the corresponding cylinder bore 18 and low pressure oil passage 41 whilst the bore is cut off its communication with the high pressure oil passage 40.

Valve springs 46, 46 . . . for biasing the distribution valves 44, 44 . . . radially and outwardly are accommodated within the valve holes 45, 45 . . . to control the distribution valves 44, 44 . . . , and the inner peripheral surface of an eccentric ring 47 is engaged with the outer end of each distribution valve 44.

Figure 2:
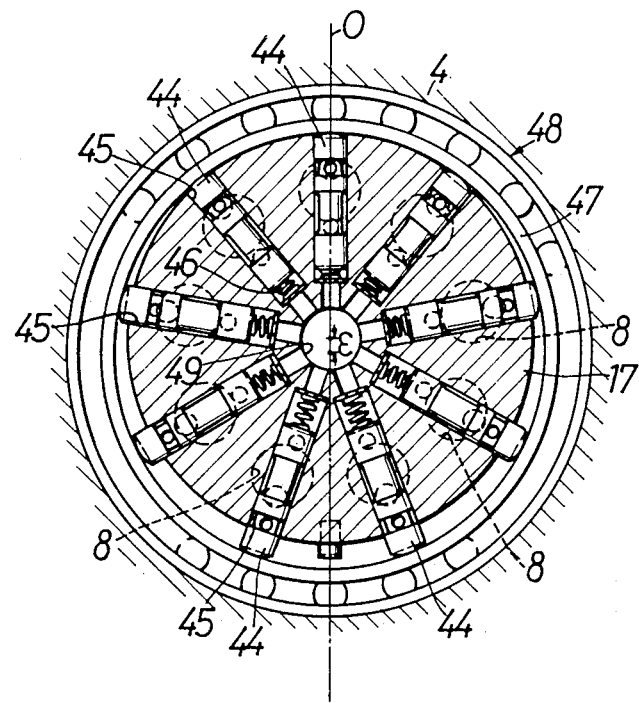
FIGS. 2 and 3 are sectional views taken on line II—II and line III—III, respectively, of FIG. 1.

The eccentric ring 47 is formed of an inner race of a ball bearing 48 snapped in and secured to the crank case 4, and as shown in FIG. 2. The ring 47 is installed at such a position that the center thereof is to be eccentric a predetermined distance $\epsilon$ from the center of the motor cylinder 17 in a direction of the tilting axis 0 of the motor swashplate 20. Accordingly, when the motor cylinder rotates, each of the distribution valves 44 takes the stroke of $2\epsilon$, which is twice of the eccentric amount $\epsilon$ of the eccentric ring 47, within the valve hole 45 and reciprocates between the aforesaid outward position and inward position.

The distribution valve 44 also functions to bring a replenishing oil passage 49 into communication with the low pressure oil passage 41 when the valve assumes the inward position in the valve hole 45. The replenishing oil passage 49 is provided in the central portion of the support shaft 24 and connected to the discharge port of a replenishing pump 50.

The pump 50 is driven by the crank shaft 1 to supply oil stored in an oil reservoir 51 at the bottom of the crank case 4 to the oil passage 49 under relatively low pressure.

Figure 3:
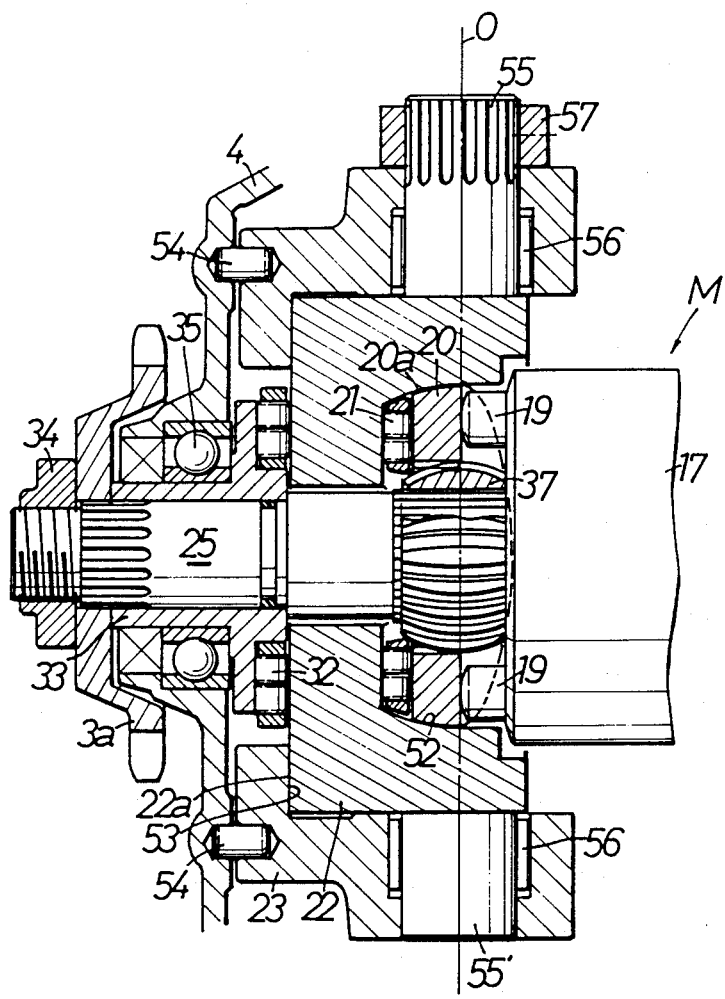
Figure 4:
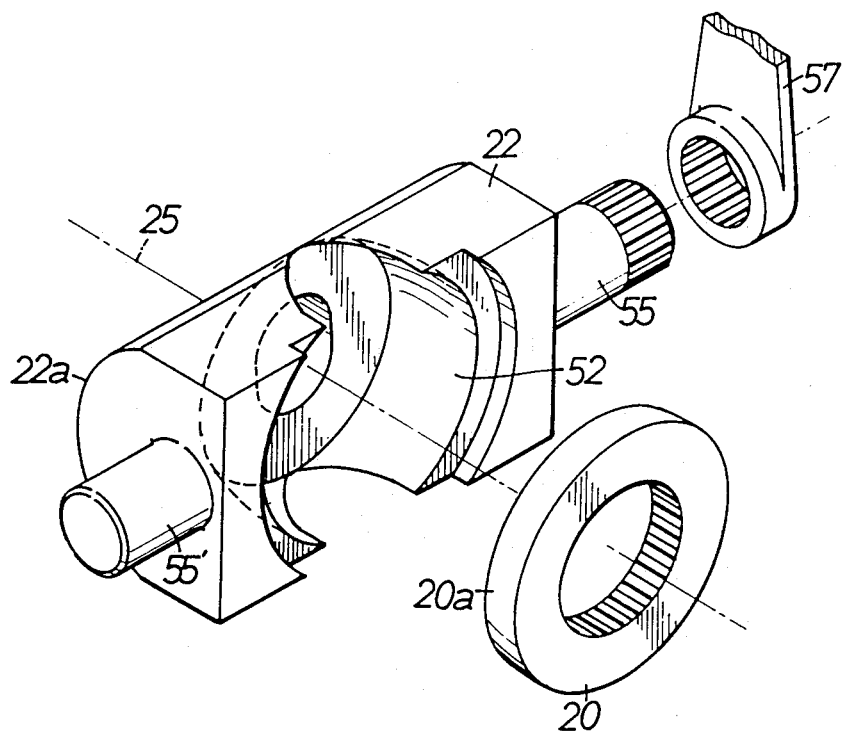
FIG. 4 is an exploded perspective view of major components of FIG. 1.

Referring to FIGS. 1, 3 and 4, an outer peripheral surface 20a of the motor swashplate 20 is formed into a spherical surface having its center at the tilting axis O. A spherical recess 52 is formed in the front surface of the swashplate holder 22 so as to receive the motor swashplate 20 along with the thrust roller bearing 21. A back surface 22a of the swashplate holder 22 is formed in a circular surface about the tilting axis O of the motor swashplate 20, and a semi-cylindrical recess 53 is formed in the front surface of the swashplate anchor 23 so as to support the swashplate holder 22 rotatably about the tilting axis O. This swashplate anchor 23 is connected to the crank case 4 through locating pins 54 so that the anchor may not be rotated about the output shaft 25.

A pair of trunnion shafts 55, 55' aligned on the tilting axis O are integrally projected on both ends of the swashplate holder 22, the trunnion shafts 55, 55' being rotatably supported on the swashplate anchor 23 through needle bearings 56. In other words, the tilting axis O is defined by the trunnion shafts 55, 55'.

An operating lever 57 is fixedly mounted on the outer end of one trunnion shaft 55.

When the trunnion shaft 55 is rotated by the operating lever 57, the swashplate holder 22 integral therewith also rotates and the latter can be tilted even during the rotation of the motor swashplate 20.

With the arrangement as described above, when the input member 5 of the hydraulic pump P is rotated from the primary reduction gear 2, suction and exhaust strokes are alternately imparted by the pump swashplate 10 to the pump plungers 9, 9 .... Then, each pump plunger 9, in suction stroke, intakes working fluid from the low pressure oil passage 41, and in exhaust stroke, feeds high pressure working fluid to the high pressure oil passage 40.

The high pressure working fluid fed to the high pressure oil passage 40 is supplied to a cylinder bore 18 through the distribution valve 44 at the inward position to force a motor plunger 19 in an expansion stroke. The working fluid within a cylinder bore 18 being moved by a motor plunger 19 in a contraction stroke is discharged into the low pressure oil passage 41 through the distribution valve 44 at the outward position.

During this operation, the pump cylinder 7 and motor cylinder 17 are rotated by the sum of reaction torque received by the pump cylinder 7 from the pump swashplate 10 through the pump plungers 9 in an exhaust stroke and reaction torque received by the motor cylinder 17 from the motor swashplate 20 through the motor plunger 19 in an expansion stroke. This rotary torque is transmitted from the output shaft 25 to the secondary reduction gear 3.

In this case, the speed change ratio of the output shaft 25 with respect to the input member 5 is given by the following equation:

$$\frac{\text{Speed change}}{\text{speed ratio}} = 1 + \frac{\text{Capacity of hydraulic motor } M}{\text{Capacity of hydraulic pump } P}$$

Thus, if the capacity of the hydraulic motor M is changed from zero to a certain value, the speed change ratio can be changed from 1 to a required value.

Incidentally, since the capacity of the hydraulic motor M is determined by the stroke of the motor plunger 19, the motor swashplate 20 can be tilted from an upright position to an inclined position to thereby steplessly control the ratio from 1 to a certain value.

During the operation of the hydraulic pump P and hydraulic motor M as described above, the pump swashplate 10 and motor swashplate 20 receive the opposite thrust load from the group of pump plungers 9, 9 ... and the group of motor plungers 19, 19 ..., respectively. The thrust load applied to the pump swashplate 10 is carried by the support shaft 24 through the thrust roller bearing 11, input member 5, thrust roller bearing 12, support sleeve 13 and nut 30. The thrust load applied to the motor swashplate 20 is carried by the output shaft 25 through the thrust roller bearing 21, swashplate holder 22, swashplate anchor 23, thrust roller bearing 32, support sleeve 33, sprocket 3a and nut 34. Since the support shaft 24 and output shaft 25 are integrally connected together through the motor cylinder 17, the aforesaid thrust load merely gives rise to tensile stress caused in the motor cylinder 17 system and exerts no action on the crank case 4 which supports the support shaft 24 and the output shaft 25.

If working fluid leaks from the hydraulic closed circuit between the hydraulic pump P and the hydraulic motor M during the aforementioned operation, when the distribution valve 44 assumes the inward position in the valve hole 45, working fluid in the leaked amount is replenished from the replenishing oil passage 49 to the low pressure oil passage 41 through that distribution valve 45.

Turning again to FIG. 1, a speed change control device 60 is connected to the operating lever 57 of the trunnion shaft 55 for the tilting operation of the motor swashplate 20.

The speed change control device 60 comprises a cylinder 61 secured to the swashplate anchor 23, and a pair of first and second pistons $62_1$, $62_2$ which are slidably fitted in the cylinder 61 and are opposed to each other so as to hold a tip end of the operating lever 57 therebetween in their rotary direction. The pistons $62_1$, $62_2$ are arranged so as to enable rotation of the operating lever 57 by their sliding movement.

The first and second pistons $62_1$, $62_2$ define first and second oil chambers $63_1$, $63_2$ against respective opposed end walls of the cylinder 61. The chambers $63_1$, $63_2$ accommodate therein springs $64_1$, $64_2$ for urging the corresponding pistons $62_1$, $62_2$ toward the operating lever 57.

The first and second oil chambers $63_1$, $63_2$ communicate with each other through a hydraulic conduit 66 incorporating therein a speed change control valve 65. The conduit is filled working fluid.

The speed change control valve 65 comprises a fixed valve casing 67 and a rotary valve 69 rotatably fitted in a valve port 68 of the valve casing 67. The rotary valve 69 is operated for rotation between a hold position A, a speed reduction position B and a speed increasing position C on both sides of the position A by means of a speed change lever 70 secured to the outer end of the rotary valve 69.

The rotary valve 69 is provided with a communication port 72 incorporating a check valve 71. The valve casing 67 includes a first forked port $73_1$ connected to the first oil chamber $63_1$ and opening to one side of the valve port 68, and a second forked port $73_2$ connected to the second oil chamber $63_2$ and opening to the other side of the valve port 68. The communication port 72 is designed such that in the hold position A of the rotary valve 69, the communication port 72 does not communicate with either forked ports $73_1$, $73_2$; in the speed reduction position B, the port 72 communicates with both the forked ports $73_1$, $73_2$ to allow a flow of oil only in one direction from the former $73_1$ to the latter $73_2$; and in the speed increasing position C, the port 72 communicates with both forked ports $73_1$, $73_2$ so as to allow oil flow only in the direction from the latter $73_2$ to the former $73_1$.

Since the number of the motor plungers 19, 19 ... is odd, the thrust load applied by the group of motor plungers 19, 19 ... to the motor swashplate 20 during the rotation of the motor cylinder 17 alternately varies in intensity between one side and the other with the tilting axis of the motor swashplate 20 as a border. Vibratory tilting torque acts on the motor swashplate 20. This vibratory tilting torque alternately acts as a pressing force on the first and second pistons $62_1$, $62_2$ through the operating lever 57.

With this, when the speed change lever 70 is shifted to the reduction position B as shown, the flow of oil from the first oil chamber $63_1$ to the second oil chamber $63_2$ is permitted by the check valve 71 but the opposite flow is inhibited. Thus, when the pressing force acts on the first piston $62_1$ from the operating lever 57, the oil flows from the first oil chamber $63_1$ to the second oil chamber $63_2$. As a consequence of this both the pistons $62_1$, $62_2$ are moved toward the first oil chamber $63_1$ to turn the operating lever 57 in the direction of increasing the inclination of the motor swashplate 20.

When the lever 70 is shifted to the increasing position C, the flow of oil from the second oil chamber $63_2$ to the first oil chamber $63_1$ is permitted by the check valve 71 but the opposite flow is inhibited. Thus, when the pressing force acts on the second piston $62_2$ from the operating lever 57, the oil flows from the second oil chamber $63_2$ to the first oil chamber $63_1$. As a consequence of this, both the pistons $62_1$, $62_2$ are moved toward the second oil chamber $63_2$ to turn the operating lever 57 toward the upright position of the motor swashplate 20.

When the speed change lever 70 is returned to the hold position A, communication between both the oil chambers $63_1$, $63_2$ is completely cut off and the flow of oil therebetween is inhibited. Therefore, both the pistons $62_1$, $62_2$ become unable to move. The operating lever 57 is held at its position to lock the motor swashplate 20 at the upright position or inclined position.

Between the high and low pressure oil passages 40, 41, there is provided one or more piston type clutch valves 80. This clutch valve 80 is slidably fitted in a radial valve port 81 which extends from the high pressure oil passage 40 to the low pressure oil passage 40 and opens to the outer peripheral surface of the motor cylinder 17. When the valve occupies the radial inward position (clutch ON position) in the valve port 81, both the oil passages 40, 41 are interrupted. When the valve occupies the radial outward position (clutch OFF position), both the oil passages 40, 41 are brought into communication with each other.

In order that the clutch valve 80 is urged toward the clutch OFF position, the inner end thereof receives oil pressure from the high pressure oil passage 40. A common clutch control ring 82 is slidably provided around the outer periphery of the pump cylinder 7 and is engaged with the outer end of valve 8.

The clutch control ring 82 includes a cylindrical inner peripheral surface 82a for defining the clutch ON position of the clutch valve 80 and a tapered surface 82b joined to one end of said inner peripheral surface to define the clutch OFF position of the clutch valve 80. The ring is urged by means of a spring 83 toward the side wherein the clutch valve 80 is held in the clutch ON position. This spring 83 is compressed between the clutch control ring 82 and a retainer 84 engaged on the outer periphery of the pump cylinder 7.

The clutch control ring 82 is connected to a not-shown clutch operating lever through a shift fork 85, an intermediate lever 86 and a clutch wire 87. The shift fork 85 engages an outer peripheral groove 88 of the clutch control ring 82, and an operating rod 89 secured to the base of the shift fork 85 extends through the crank case 4 and is operatively connected to the intermediate lever 86.

With this, when the clutch control ring 82 is moved to the right as viewed in the figure against the force of the spring 83 through the shift fork 85 by pulling the clutch wire 87, the tapered surface 82b of the clutch control ring 82 assumes a position opposed to the clutch valve 80. Therefore the clutch valve 80 is moved by the pressure of the high pressure oil passage 40 to the outward position, namely, to the clutch OFF position. As the result, the high pressure oil passage 40 and low pressure oil passage 41 are short-circuited through the valve port 81, and so the pressure of the high pressure oil passage 40 is lowered to disable the feed of pressure oil to the hydraulic motor M to make the hydraulic motor M inoperative. In this case, if a plurality of clutch valves 80 are arranged in the circumferential direction of the high and low pressure oil passages 40, 41, the short-circuiting resistance of both the oil passages 40, 41 is decreased.

When the clutch control ring 82 is moved to left to operate the clutch valve 80 toward the clutch ON position, the working fluid is circulated between the hydraulic pump P and the hydraulic motor M through the high and low pressure oil passages 40, 41 in a manner as previously mentioned, and the hydraulic motor M is returned to its operating condition.

In an intermediate position between the aforesaid rightward position and leftward position of the clutch control ring 82, a communication opening between both the oil passages 40, 41 is moderately adjusted and the working fluid may be circulated according to the degree of opening thereof to place the hydraulic motor M in a half-clutch state.

What is claimed is:

1. A static hydraulic pressure type continuously variable transmission formed with a hydraulic closed circuit between a swashplate type hydraulic pump and a swashplate type hydraulic motor, comprising a pump cylinder of said hydraulic pump and a motor cylinder of said hydraulic motor which are integrally connected to each other in a coaxial manner with said hydraulic closed circuit being formed between both the cylinders; a first shaft integrally projected from an outer end surface of said pump cylinder and rotatably supported on a casing; an input member mounted on said first shaft relatively rotatably and axially immovably, a pump swashplate of said hydraulic pump being mounted on said input member; a second shaft rotatably supported on said casing coaxially with said first shaft, said second shaft being integrally projected from an outer end surface of said motor cylinder; and a non-rotatable swashplate anchor mounted on said second shaft axially immovably, said hydraulic motor having a motor swashplate tiltably supported on said swashplate anchor.

2. The transmission according to claim 1, wherein said second shaft is an output shaft.

3. The transmission according to claim 1 or 2, wherein a support sleeve is provided on an outer end of said second shaft axially immovably and unrotatably relative to the shaft, and said swashplate anchor is supported on said support sleeve through a bearing.

4. The transmission according to claim 3, wherein said swashplate type hydraulic motor is of a variable capacity type.

5. The transmission according to claim 1 or 2, wherein an output member is mounted on said second shaft for integral rotation.

6. The transmission according to claim 5, wherein said swashplate type hydraulic motor is of a variable capacity type.

7. The transmission according to claim 1, wherein said hydraulic closed circuit is integrally provided between said pump cylinder and said motor cylinder.

8. The transmission according to claim 7, wherein said pump cylinder is fitted around an outer peripheral surface of said first shaft and held in place axially immovably.

9. The transmission according to claim 7 or 8, wherein said hydraulic closed circuit comprises a number of cylinder bores annularly arranged in said pump cylinder, a number of cylinder bores annularly arranged in said motor cylinder, an annular high pressure oil passage interposed between the pump cylinder bores and the motor cylinder bores to communicate with all the pump cylinder bores through a discharge valve, and an annular low pressure oil passage interposed between said pump cylinder bores and said motor cylinder bores to communicate with all the pump cylinder bores through an intake valve, said low and high pressure oil passages being disposed concentrically.

10. The transmission according to claim 9, wherein said swashplate type hydraulic motor is of a variable capacity type.

11. The transmission according to claim 7 or 8, wherein said hydraulic closed circuit comprises a number of cylinder bores annularly arranged in said pump cylinder, a number of cylinder bores annularly arranged in said motor cylinder, a high pressure oil passage interposed between the pump cylinder bores and the motor cylinder bores to communicate with all the pump cylinder bores through a discharge valve, a low pressure oil passage which communicates with the pump cylinder bores through an intake valve, and a distribution valve for bringing the motor cylinder bores into alternate communication with said low and high pressure oil passages, said distribution valve being provided so as to be rotatable integrally with said motor cylinder and said pump cylinder.

12. The transmission according to claim 11, wherein said distribution valve is slidably fitted in a valve hole formed in said motor cylinder.

13. The transmission according to claim 12, wherein said swashplate type hydraulic motor is of a variable capacity type.

14. The transmission according to claim 11, wherein said swashplate type hydraulic motor is of a variable capacity type.

15. The transmission according to claim 1, 2, 7 or 8, wherein said swashplate type hydraulic motor is of a variable capacity type.

16. A static hydraulic pressure type continuously variable transmission formed with a hydraulic closed circuit between a swashplate type hydraulic pump and a swashplate type hydraulic motor, comprising an output shaft; a pump cylinder of said hydraulic pump and a motor cylinder of said hydraulic motor which are integrally connected to said output shaft; a number of cylinder bores annularly arranged in said pump cylinder; a number of cylinder bores annularly arranged in said motor cylinder; an annular high pressure oil passage communicated with all the cylinder bores of said pump cylinder through a discharge valve, an annular low pressure oil passage communicated with said cylinder bores of the pump cylinders through an intake valve, said high and low oil passages being formed concentrically with each other between said pump cylinder bores and said motor cylinder bores; and a distribution valve adapted to reciprocate between a radial outward position and a radial inward position to bring said number of cylinder bores of said motor cylinder into alternate communication with said high and low oil passages, said distribution valve being associated with an eccentric actuating device to impart reciprocating motion to said distribution valve in response to rotation of said pump cylinder and said motor cylinder and being operated such that each of said cylinder bores of said motor cylinder is brought into communication with said high pressure oil passage in expansion stroke and is brought into communication with said low pressure oil passage in contraction stroke.

17. The transmission according to claim 16, wherein a plurality of said distribution valves are radially provided.

18. The transmission according to claim 17, wherein the number of said distribution valves provided corresponds to that of said cylinder bores of said motor cylinder.

19. The transmission according to claim 16, wherein said eccentric actuating device comprises an eccentric ring having a center located at a position eccentric with respect to an axis of rotation of said motor cylinder.

20. The transmission according to claim 19, wherein said eccentric ring is supported on said casing.

21. The transmission according to claim 19, wherein said eccentric ring is composed of an inner race of a ball bearing secured to said casing.

22. The transmission according to claim 16, 17 or 18, wherein said distribution valve brings said low pressure oil passage into communication with a replenishing oil passage when said low pressure oil passage is cut off communication with said cylinder bores of said motor cylinder.

23. The transmission according to claim 22, wherein said swashplate type hydraulic motor is of a variable capacity type.

24. The transmission according to claim 16, 17, 18, 19, 20 or 21, wherein said swashplate type hydraulic motor is of a variable capacity type.

25. A static hydraulic pressure type continuously variable transmission formed with a hydraulic closed circuit between a swashplate type hydraulic pump and a variable capacity swashplate type hydraulic motor, said hydraulic motor including a motor cylinder, a motor swashplate, and a tiltable swashplate holder for supporting a back surface of said motor swashplate, said motor cylinder being integrally connected with an output shaft which extends through said motor swashplate and said swashplate holder, a swashplate anchor for supporting a back surface of said swashplate holder being supported axially immovably on said output shaft through a thrust bearing and being unrotatably connected to a casing which rotatably supports said output shaft.

26. The transmission according to claim 25, wherein a support sleeve is integrally mounted on said output shaft against axial movement, said swashplate anchor being supported on said support sleeve through said thrust bearing, said support sleeve being supported on said casing through a bearing.

27. A static hydraulic pressure type continuously variable transmission formed with a hydraulic closed circuit between a swashplate type hydraulic pump and a swash-plate type hydraulic motor, comprising an annular low pressure oil passage and an annular high pressure oil passage, said annular low and high pressure oil passages being concentrically formed with each other at a position adjacent a group of cylinder bores arranged annularly in a pump cylinder of said hydraulic pump, said low and high pressure oil passages being communicated with said cylinder bores through an intake valve and a discharge valve, respectively, a radially extending valve port being provided to receive a clutch valve which is capable of opening and closing said valve port for communication between said low and high pressure oil passages.

28. The transmission according to claim 27, wherein said high pressure oil passage is provided at a radially inner side position than said low pressure oil passage, and said clutch valve is normally biased so as to project outwardly from said valve port by oil pressure of said high pressure oil passage acting on a radial inner end thereof, and wherein means is provided to control movement of said clutch valve into and out of said valve port, said clutch valve increasing an amount of communication between said low and high pressure oil passages as said valve projects out from said valve port.

29. A static hydraulic pressure type continuously variable transmission formed with a hydraulic closed circuit between a swashplate hydraulic pump and a swash-plate type hydraulic motor, comprising an annular low pressure oil passage and an annular high pressure oil passage, said annular low and high pressure oil passages being concentrically formed with each other at a position adjacent a group of cylinder bores annularly arranged in a pump cylinder of said hydraulic pump, said low and high pressure oil passages being communicated with said cylinder bores through an intake valve and a discharge valve, respectively, a plurality of radially extending valve ports being provided to respectively receive a plurality of clutch valves which are capable of opening and closing said valve ports for communication between said low and high pressure oil passages, and a common clutch control ring for opening and closing said clutch valves being supported on an outer peripheral surface of said pump cylinder.

30. The transmission according to claim 29, wherein each of said clutch valves is of a sliding type which opens and closes the corresponding valve port by making a reciprocating sliding movement in the port, and said clutch control ring is axially slidably supported on the outer peripheral surface of said pump cylinder and is provided at an inner peripheral surface thereof with a tapered surface for imparting opening and closing movement to said clutch valve by axial sliding movement of the ring.

31. The transmission according to claim 29 or 30, wherein said high pressure oil passage is positioned on a radially inner side than said low pressure oil passage.

32. The transmission according to claim 31, wherein said clutch valve has a radial inner end, on which oil pressure within said high pressure oil passage acts.

33. The transmission according to claim 32, wherein said swashplate type hydraulic motor is of a variable capacity type.

34. The transmission according to claim 31, wherein said swashplate type hydraulic motor is of a variable capacity type.

35. The transmission according to claim 27, 28, 29, or 30, wherein said swashplate type hydraulic motor is of a variable capacity type.

36. A static hydraulic pressure type continuously variable transmission formed with a hydraulic closed circuit between a swashplate type hydraulic pump and a swashplate type hydraulic motor, said hydraulic motor having an odd-number of motor plungers respectively slidably fitted in cylinder bores annularly arranged in a motor cylinder, wherein a speed change control device is provided to adjust an angle of inclination of a tiltable motor swash-plate, which is in pressure contact with said odd number of motor plungers, by making use of pulsations in intensity of a thrust load caused during operation on an operation surface of the motor swashplate between both sides of a tilting axis as a border.

37. The transmission according to claim 36, wherein said speed change control device comprises a trunnion shaft for tiltably supporting a swashplate holder which carries said motor swashplate on a stationary casing; an operating lever secured to said trunnion shaft for integral rotation with said trunnion shaft; a piston operatively associated with said operating lever and being slidingly movable within a stationary cylinder in response to rotation of said operating lever; first and second oil chambers defined between said cylinder and piston, said first and second oil chambers being opposed to each other with said piston interposed therebetween; a hydraulic conduit providing communication between said first and second oil chambers and filled therein with working fluid; and a speed change control valve incorporated in said hydraulic conduit to control communication and interruption between said first and second oil chambers through said hydraulic conduit and permit flow of said working oil within the hydraulic conduit in one direction during their communication.

38. The transmission according to claim 37, wherein when communication between said first and second oil chambers is interrupted, said motor swashplate is locked untiltably, whilst when both the oil chambers are communicated with each other, said angle of inclination of the motor swashplate is made variable.

39. A static hydraulic pressure type continuously variable transmission formed with a hydraulic closed circuit between a swashplate type hydraulic pump and a variable capacity and swashplate type hydraulic motor, said hydraulic motor having a plurality of motor plungers respectively slidably fitted in cylinder bores annularly arranged in a motor cylinder thereof, wherein a speed change control device is provided so as to adjust, during operation, an angle of inclination of a tiltable motor swashplate in pressure contact with said plurality of motor plungers, said speed change control device comprising a trunnion shaft for tiltably supporting a swashplate holer which supports said motor swashplate on a stationary casing; an operating lever secured to said trunnion shaft for integral rotation therewith; a piston operatively associated with said operating lever and being slidingly movable with a stationary cylinder in response to rotation of the operating lever; first and second oil chambers defined between said cylinder and piston, said both oil chambers being opposed to each other with said piston interposed therebetween; a hydraulic conduit providing communication between said first and second oil chambers and filled therein with working fluid; and a speed change control valve incorporated in said hydraulic conduit to control communication and interruption between said first and second oil chambers through said hydraulic conduit and permit flow of said working fluid within the hydraulic conduit in one direction during their communication.

40. The transmission according to claim 39, wherein when communication between the first and second oil chambers is interrupted, said motor swashplate is untiltably locked, whereas when both the oil chambers are communicated with each other, said angle of inclination of the motor swashplate is made variable.

41. A static hydraulic pressure type continuously variable transmission comprising
   a casing;
   a swashplate type hydraulic pump;
   a swashplate type hydraulic motor in said casing having a motor cylinder, a motor swashplate, a motor shaft rotatably supported in said casing and being fixed to said motor cylinder and extending from one end thereof and a swashplate anchor axially immovably mounted on said motor shaft for relative rotation between said swashplate anchor and said motor shaft, said motor swashplate being tiltably supported by said swashplate anchor and said motor swashplate being constrained to rotate with said motor shaft; and
   a hydraulic closed circuit between said pump cylinder and said motor cylinder.

42. A static hydraulic pressure type continuously variable transmission comprising:
   a hydraulic pump having a pump cylinder;
   a hydraulic motor having a motor cylinder;
   a hydraulic closed circuit between said hydraulic pump and motor; and
   a transmission shaft;
   said pump cylinder and said motor cylinder being integrally connected together to form a cylinder block which is disposed on said transmission shaft, said transmission shaft projecting from opposite sides of said cylinder block.

43. The transmission of claim 42 wherein said transmission shaft is a power output shaft.

44. The transmission of claim 42 wherein said transmission shaft is integrally connected to said cylinder block.

45. The transmission of claim 42, further comprising a casing, said transmission shaft being supported on said casing.

46. The transmission of claim 42 wherein said hydraulic closed circuit is integrally formed with said cylinder block between said pump cylinder and said motor cylinder.

47. The transmission of claim 42 wherein said hydraulic closed circuit comprises a high pressure oil passage and a low pressure oil passage and wherein a number of pump cylinder bores are arranged in said pump cylinder and a number of motor cylinder bores are arranged in said motor cylinder, said pump cylinder bores and said motor cylinder bores being placed in communication with said high pressure oil passage and said low pressure oil passage via a distribution device.

48. The transmission of claim 47 wherein said high pressure oil passage and said low pressure oil passage are arranged annularly within said cylinder block and are disposed concentrically with respect to each other.

49. The transmission of claim 47 wherein said distribution device is rotatable together with said pump cylinder and said motor cylinder.

50. A static hydraulic pressure type continuously variable transmission comprising:
   a hydraulic pump having a pump cylinder;
   a hydraulic motor having a motor cylinder;
   a hydraulic closed circuit between said hydraulic pump and motor; and
   a transmission shaft;
   said pump cylinder and said motor cylinder being integrally connected with each other to form a cylinder block which is disposed on said transmission shaft;
   wherein a thrust force generated from said pump and motor is received and supported by said transmission shaft.

51. The transmission of claim 50 wherein said thrust force is received and supported on the motor side of said transmission shaft.

52. The transmission of claim 50 wherein said thrust force is received and supported on both of pump and motor sides of said transmission shaft.

53. The transmission of claim 50 wherein said transmission shaft projects from opposite sides of said cylinder block.

54. The transmission of claim 50 wherein said transmission shaft is a power output shaft.

55. The transmission of claim 50 wherein said transmission shaft is integrally connected to said cylinder block.

56. The transmission of claim 50 further comprising a casing, said transmission shaft being supported on said casing.

57. The transmission of claim 50 wherein said hydraulic closed circuit is integrally formed with said cylinder block between said pump cylinder and said motor cylinder.

58. The transmission of claim 50 wherein said hydraulic closed circuit comprises a high pressure oil passage and a low pressure oil passage and wherein a number of pump cylinder bores are arranged in said pump cylinder and a number of motor cylinder bores are arranged in said motor cylinder, said pump cylinder bores and said motor cylinder bores being placed in communication with said high pressure oil passage and said low pressure oil passage via a distribution device.

59. The transmission of claim 58 wherein said high pressure oil passage and said low pressure oil passage are arranged annularly within said cylinder block and are disposed concentrically with respect to each other.

60. The transmission of claim 58 wherein said distribution device is rotatable together with said pump cylinder and said motor cylinder.

61. A static hydraulic pressure type continuously variable transmission comprising:
   a hydraulic pump having a pump cylinder;
   a hydraulic motor having a motor cylinder;
   a hydraulic closed circuit between said hydraulic pump and motor; and
   a transmission shaft;
   said pump cylinder and said motor cylinder being integrally connected with each other to form a cylinder block which is disposed on said transmission shaft;

wherein a number of pump cylinder bores are arranged in said pump cylinder and a number of motor cylinder bores are arranged in said motor cylinder;

wherein said hydraulic closed circuit is integrally formed with said cylinder block between said pump cylinder and said motor cylinder and comprises a high pressure oil passage and a low pressure oil passage, said pump cylinder bores and motor cylinder bores being placed in communication with said high pressure oil passage and said low pressure oil passage via a distribution device;

said distribution device comprising a plurality of distribution valves which are rotatable in response to rotation of said cylinder block and which are operable to alternately communicate said motor and pump cylinder bores with said high pressure oil passage and low pressure oil passage, respectively, said distribution valves projecting outside of said cylinder block and at projected parts thereof engaging with and being driven by a distribution valve driving means which is disposed outside of said cylinder block.

62. The transmission of claim 61 wherein said high pressure oil passage and said low pressure oil passage are arranged annularly within said cylinder block and one of said oil passages encircles the other, and wherein said distribution valves reciprocate between said annular high and low pressure oil passages.

63. The transmission of claim 62 wherein said annular high and low pressure oil passages are disposed concentrically with said transmission shaft and said distribution valves perform reciprocating motions between a radially inner position and a radially outer position in the cylinder block.

64. The transmission of claim 63 wherein said distribution valve driving means is an eccentric ring positioned eccentric with respect to an axis of said cylinder block.

65. The transmission of claim 64 wherein said plurality of distribution valves are disposed in a radial arrangement.

66. The transmission of claim 61 wherein each of the distribution valves receives at an inner end thereof an oil pressure urging the valve toward said distribution valve driving means.

67. The transmission of claim 61 wherein said distribution valves place said motor cylinder bores into alternate communication with said high pressure oil passage and said low pressure oil passage.

68. The transmission of claim 61 wherein said low pressure oil passage is communicated with an oil feed passage.

69. A static hydraulic pressure type continuously variable transmission comprising:
 a hydraulic pump;
 a hydraulic motor; and
 a hydraulic closed circuit between said hydraulic pump and motor;
 wherein said hydraulic closed circuit comprises a high pressure oil passage formed of a first annular oil passage and a low pressure oil passage formed of a second annular oil passage, one of said first and second annular oil passages encircling the other, said first annular oil passage communicating with said pump during discharge strokes thereof and said second annular oil passage communicating with said pump during suction strokes thereof;
 wherein a clutch valve means is disposed in said hydraulic closed circuit and is operable to assume at least a first position at which a high pressure is maintained in said high pressure oil passage and a second position at which the pressure in said high pressure oil passage is reduced.

70. The transmission of claim 69 wherein when said clutch valve means is at said second position, said high pressure oil passage and said low pressure oil passage are communicated with each other.

71. The transmission of claim 69 further comprising a clutch driving device, said clutch valve means engaging at a first end with said clutch driving device and at a second end, which is opposite said first end, being exposed to said hydraulic closed circuit so as to be urged toward its first end.

72. The transmission of claim 71 wherein said clutch valve means is disposed radially with respect to the hydraulic closed circuit and is movable radially to assume at least said first and second positions, and wherein said first end of the clutch valve means is on a radially outer side and its second end is on a radially inner side.

73. The transmission of claim 72 wherein said second end of the clutch valve means is exposed to said high pressure oil passage.

74. The transmission of claim 73 wherein said first annular oil passage is disposed on a radially inner side and said second annular oil passage is disposed on a radially outer side of a cylinder block, said cylinder block being integral with a pump cylinder for said pump and a motor cylinder for said motor.

75. The transmission of claim 71 wherein said second end of the clutch valve means is exposed to said high pressure oil passage.

76. The transmission of claim 75 wherein said first annular oil passage is disposed on a radially inner side and said second annular oil passage is disposed on a radially outer side of a cylinder block, said cylinder block being integral with a pump cylinder for said pump and a motor cylinder for said motor.

77. A swashplate type hydraulic pressure device comprising:
 a cylinder;
 a tiltable swashplate; and
 an odd-number of plungers respectively slidably fitted in cylinder bores arranged annularly in said cylinder, said plungers being in pressure contact with an operating surface of the tiltable swashplate;
 wherein means is provided to adjust an angle of inclination of said tiltable swashplate by making use of pulsations in intensity of a thrust load caused during operation by said plungers abutting on the operating surface of the swashplate between opposite sides of a tilting axis of the plate.

78. A static hydraulic pressure type continuously variable transmission comprising:
 a hydraulic pump having a pump cylinder;
 a hydraulic motor having a motor cylinder;
 a hydraulic closed circuit between said hydraulic pump and said hydraulic motor; and
 a transmission shaft;
 wherein said pump cylinder and said motor cylinder are disposed on said transmission shaft and a thrust force generated from said hydraulic pump and motor is received and supported by said transmission shaft.

79. The transmission of claim 78 wherein said thrust force is received and supported at least on the motor side of said transmission shaft.

80. The transmission of claim 78 wherein said thrust force is received and supported on both the pump and motor sides of said transmission shaft.

81. The transmission of claim 78 wherein said pump cylinder and said motor cylinder are disposed in an opposed relation with respect to each other.

82. The transmission of claim 78 wherein said transmission shaft projects from outer sides of said pump cylinder and said motor cylinder.

83. The transmission of claim 78 wherein said transmission shaft is shaped into a rod-like form.

84. The transmission of claim 78 wherein said transmission shaft is a power output shaft.

85. The transmission of claim 78 wherein said transmission shaft is integrally connected with said pump cylinder and said motor cylinder.

86. The transmission of claim 78 further comprising a casing, said transmission shaft being supported on said casing.

87. The transmission of claim 78 further comprising a casing, wherein said transmission shaft projects from outer sides of said pump cylinder and motor cylinder and is supported at projected parts thereof on said casing.

88. The transmission of claim 78 wherein said hydraulic closed circuit is disposed between said pump cylinder and said motor cylinder and comprises a high pressure oil passage and a low pressure oil passage; wherein a number of pump cylinder bores are arranged in said pump cylinder and a number of motor cylinder bores are arranged in said motor cylinder; and wherein said pump cylinder bores and motor cylinder bores are placed in communication with said high pressure oil passage and said low pressure oil passage via a distribution device.

89. The transmission of claim 88 wherein said high pressure oil passage and said low pressure oil passage are arranged annularly and concentrically with respect to each other.

90. The transmission of claim 89 wherein said hydraulic closed circuit is integrally formed with a cylinder block disposed between said pump cylinder and said motor cylinder.

91. The transmission of claim 88 wherein said hydraulic closed circuit is integrally formed with a cylinder block disposed between said pump cylinder and said motor cylinder, and said distribution device is rotatable together with said cylinder block.

92. The transmission of claim 91 wherein said cylinder block is integrally connected with said pump cylinder and said motor cylinder.

93. A static hydraulic pressure type continuously variable transmission comprising:
a hydraulic pump having a pump swashplate;
a hydraulic motor having a motor swashplate;
a hydraulic closed circuit between said hydraulic pump and said hydraulic motor; and
a rigid member;
wherein said rigid member extends over the hydraulic pump and the hydraulic motor to positions outside said pump swashplate and said motor swashplate, said rigid member receiving and supporting thereon a thrust force generated from said hydraulic pump and motor.

94. The transmission of claim 93 wherein said rigid member comprises a transmission shaft.

95. The transmission of claim 93 or 94 wherein said hydraulic pump has a pump cylinder and said hydraulic motor has a motor cylinder, said rigid member penetrating centrally through said pump cylinder and motor cylinder.

96. The transmission of claim 95 wherein said pump swashplate and said motor swashplate are supported in an axial direction of the rigid member by securing means which are provided at axial opposite end portions of said rigid member, respectively.

97. A static hydraulic pressure type continuously variable transmission comprising:
a hydraulic pump having a pump cylinder;
a hydraulic motor having a motor cylinder; and
a hydraulic closed circuit between the hydraulic pump and the hydraulic motor, the hydraulic closed circuit having a high pressure oil passage and a low pressure oil passage which are defined in the pump and motor cylinders in a manner distanced from each other;
wherein a number of cylinder bores are arranged in the pump cylinder and a number of cylinder bores are arranged in the motor cylinder, to slidably receive therein a number of plungers, respectively; and
wherein a number of distribution valves are disposed in at least one of the pump cylinder and the motor cylinder, said number of distribution valves being rotatable in response to rotation of said at least one cylinder and alternately communicating the cylinder bores of said at least one cylinder with the high pressure oil passage and the low pressure oil passage, respectively, while being driven externally of the cylinder to perform a reciprocating movement by a distributor valve driving means located outside of said at least one cylinder.

98. The transmission of claim 97, wherein said distribution valves project outside from the at least one cylinder and at projecting parts thereof engage the distribution valve driving means.

99. The transmission of claim 97, wherein the high and low pressure oil passages are disposed concentrically with respect to each other.

100. The transmission of claim 99, wherein said distribution valves are arranged radially in said at least one cylinder and are adapted to reciprocate between radially inner and outer positions in said at least one cylinder.

101. The transmission of claim 100, wherein a separate one of said distribution valves is provided for each of said cylinder bores in said at least one cylinder.

102. The transmission of claim 97, wherein a separate one of said distribution valves is provided for each of said cylinder bores in said at least one cylinder.

103. The transmission of claim 97, wherein said distribution valves project outside from the at least one cylinder and at projecting parts thereof engage the distribution valve driving means and wherein said distribution valves are arranged radially in said at least one cylinder and are adapted to reciprocate between radially outer and inner positions in that cylinder.

104. A swashplate type hydraulic system comprising:
a cylinder block having a number of cylinder bores annularly arranged therein;
a number of plungers each slidably received in one of the cylinder bores;

a swashplate engaging those ends of said plungers which protrude from the cylinder bores; and a high pressure oil passage and a low pressure oil passage which are defined in the cylinder block in a manner distanced from each other;

wherein a working oil is transferred between these high and low oil pressure passages and the cylinder bores during relative rotation between the cylinder block and the swashplate;

wherein a plurality of distribution valves are disposed in the cylinder block to alternately communicate the cylinder bores with said high pressure oil passage and low pressure oil passage, respectively, while being urged to perform a reciprocating movement by a distribution valve driving means; and wherein said distribution valve driving means is disposed outside of the cylinder block and is adapted to drive the distribution valves at positions outside of the cylinder block in response to the relative rotation between the cylinder block and the swashplate.

105. The system of claim 104, wherein said high and low pressure oil passages are disposed concentrically with respect to each other.

106. The system of claim 104, wherein said swashplate is supported by a member which is rotatable relative to the cylinder block.

107. The system of claim 104, wherein said distribution valves are arranged radially in the cylinder block.

108. The system of claim 107, wherein said distribution valves are adapted to reciprocate between radially inner and outer positions in the cylinder block.

109. The system of claim 106, wherein said high and low pressure oil passages are disposed concentrically with respect to each other.

110. The transmission of claim 104, wherein a separate one of said distribution valves is disposed for each of said cylinder bores.

111. The system of claim 104, wherein said distribution valves project outside of the cylinder block and are placed in engagement with and driven by said distribution valve driving means at positions outside of the cylinder block.

112. The system of claim 111, wherein said high and low pressure oil passages are disposed concentrically with respect to each other, and the distribution valves are arranged radially in the cylinder block and the distribution valves adapted to reciprocate between radially inner and outer positions in the cylinder block.

113. The transmission of claim 112, wherein a separate one of said distribution valves is disposed for each of said cylinder bores.

114. A swashplate type hydraulic pressure device comprising:

a cylinder;

a tiltable swashplate; and a number of plungers respectively slidably fitted in cylinder bores arranged annularly in said cylinder, said plungers being in pressure contact with an operating surface of the tiltable swashplate;

wherein means is provided to adjust an angle of inclination of said tiltable swashplate by making use of pulsations in intensity of a thrust load caused during operation by said plungers abutting on the operating surface of the swashplate between opposite sides of a tilting axis of the plate.

* * * * *

UNITED STATES PATENT AND TRADEMARK OFFICE
CERTIFICATE OF CORRECTION

PATENT NO. : 4,860,540

DATED : August 29, 1989

INVENTOR(S) : Tsutomu Hayashi et al.

It is certified that error appears in the above-identified patent and that said Letters Patent is hereby corrected as shown below:

In claim 109 (column 22, line 1) delete "106" and insert therefor -- 108 --.

Signed and Sealed this

Seventh Day of August, 1990

Attest:

HARRY F. MANBECK, JR.

*Attesting Officer*   *Commissioner of Patents and Trademarks*